United States Patent [19]

Hayden et al.

[11] Patent Number: 5,065,932
[45] Date of Patent: Nov. 19, 1991

[54] SOLDER PLACEMENT NOZZLE WITH INERT COVER GAS AND INERT GAS BLEED

[75] Inventors: Terry F. Hayden, Round Rock; Christopher A. Hicks, Austin, both of Tex.; Peter G. Ledermann, Ossining, N.Y.; Alvin D. Nguyne, Austin, Tex.; Stephen C. Steinbach, Austin, Tex.; Stanley K. Yu, Austin, Tex.

[73] Assignee: International Business Machines Corporation, Armonk, N.Y.

[21] Appl. No.: 586,654

[22] Filed: Sep. 24, 1990

[51] Int. Cl.⁵ .............................................. B23K 3/02
[52] U.S. Cl. ...................................... 228/55; 228/53; 228/42; 228/41; 228/33; 228/257; 228/214; 228/219; 222/592; 219/209
[58] Field of Search ................... 228/33, 41, 42, 51, 228/52, 55, 219, 220, 254, 256, 257, 214, 19, 20, 53; 118/415, 308; 427/123, 432; 222/591, 592, 594

[56] References Cited

U.S. PATENT DOCUMENTS

| | | |
|---|---|---|
| 1,760,519 | 5/1930 | Palmer ............................ 228/55 |
| 1,906,225 | 5/1933 | Dupau ............................ 228/53 |
| 2,194,920 | 3/1940 | Vaughn et al. ................. 228/219 |
| 2,780,712 | 2/1957 | Thomas .......................... 228/53 |
| 2,891,308 | 6/1959 | Lyons ............................. 228/41 |
| 3,358,897 | 12/1967 | Christensen .................... 228/41 |
| 3,524,752 | 8/1970 | Fleming ......................... 427/432 |
| 3,838,240 | 9/1974 | Schelhorn ...................... 228/219 |
| 3,917,147 | 11/1975 | Vanyi ............................. 228/53 |
| 4,805,830 | 2/1989 | Kawaguchi ..................... 228/53 |
| 4,976,393 | 12/1990 | Nakajima et al. .............. 228/220 |

FOREIGN PATENT DOCUMENTS

| | | | |
|---|---|---|---|
| 337149A | 10/1989 | European Pat. Off. ............ 228/33 |
| 752389 | 9/1933 | France ............................. 228/53 |
| 6158246 | 8/1984 | Japan .............................. 228/219 |
| 6918814 | 6/1971 | Netherlands ..................... 228/53 |
| 2171042A | 8/1986 | United Kingdom ............. 228/219 |

Primary Examiner—Richard K. Seidel
Assistant Examiner—Jeanne M. Elpel
Attorney, Agent, or Firm—Charles D. Gunter, Jr.

[57] ABSTRACT

A nozzle assembly is shown for depositing solder onto a series of conductive surfaces such as the mounting pads of a surface mount integrated circuit board. The nozzle assembly includes a nozzle head which has an interior bore for receiving an elongate heat source. The nozzle head also includes an orifice for receiving solid solder fed within the interior bore to contact the elongate heat source. The interior bore terminates in a solder reservoir for molten solder which is fed within the inteiror bore to contact the elongate heat source. The molten solder is dispensed through a tip opening to deposit uniform amounts of solder on each pad. A source of bleed gas is supplied to the interior of the assembly to protect the component parts and excluse oxygen from the interior of the assembly. A cover gas is also supplied to the solder site to reduce oxidation of the moltent solder and reduce the amount of flux required.

7 Claims, 3 Drawing Sheets

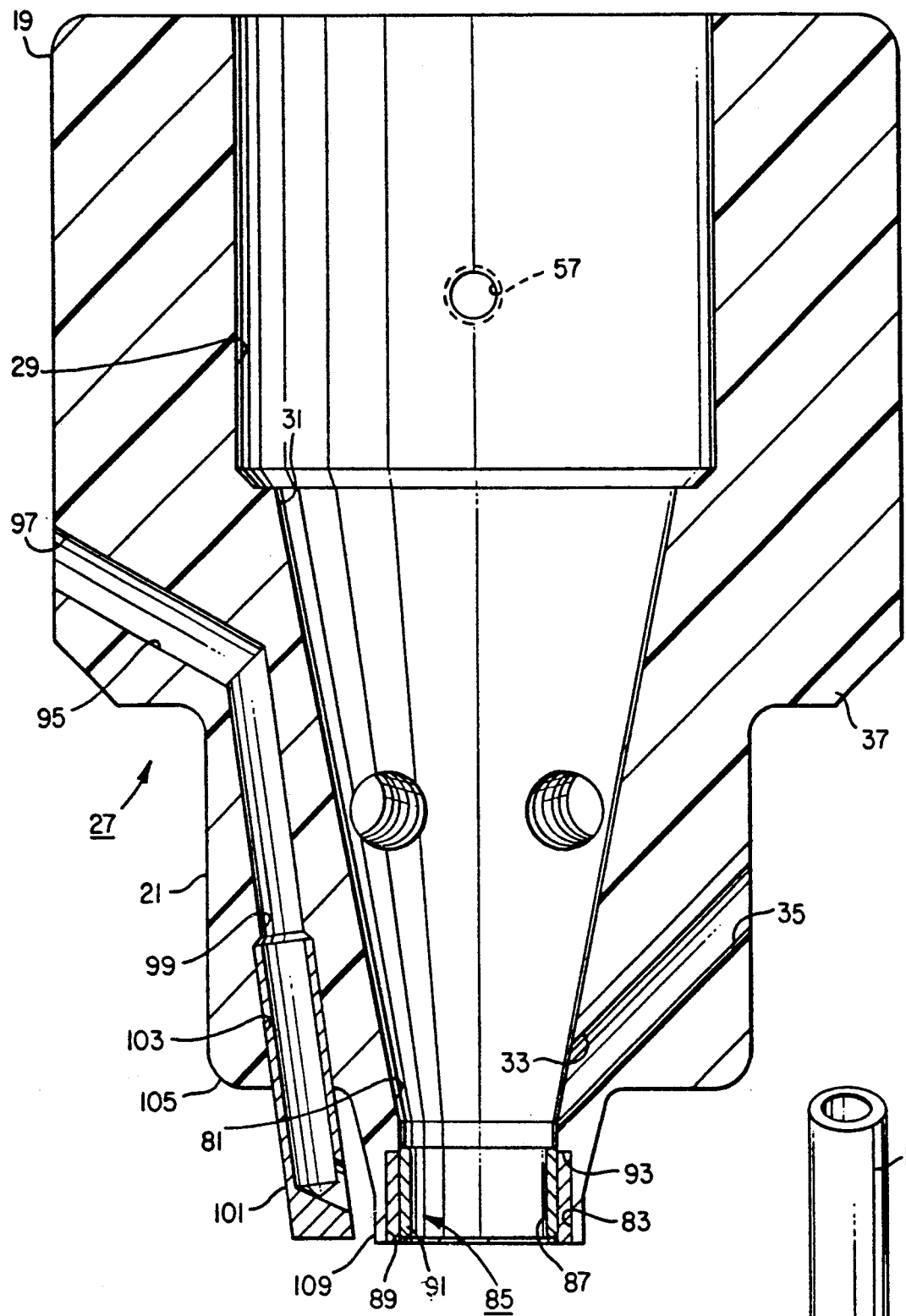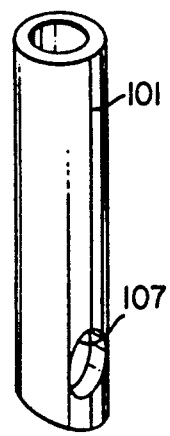
*FIG. 4*   *FIG. 5*

SOLDER PLACEMENT NOZZLE WITH INERT COVER GAS AND INERT GAS BLEED

CROSS-REFERENCE TO RELATED APPLICATIONS

This application is related to the copending application of Raymond E. Prime and Arthur L. Leersen entitled "Solder Placement Nozzle Assembly", Ser. No. 586,655, filed Sept. 24, 1990.

BACKGROUND OF THE INVENTION

1. Field of the Invention

The present invention relates to a system of soldering and particularly to an improved nozzle assembly used to deposit solder in a precise manner, as where solder is deposited onto solder wettable contact pads utilized in the semiconductor industry.

2. Description of the Prior Art

Solder distribution onto mounting pads for surface mount boards of the type used in the semiconductor industry has generally been accomplished in the prior art through the use of screening processes. In these techniques, art work and screens are fabricated having the solder deposition pattern. Then, a precision alignment process is carried out wherein the solder is screened onto the surface mount pads. The solder paste used for this process requires a substantial cure time and a substantial bake time. Various problems result due to the complexity of the alignment process making the prior art technique relatively time consuming The prior art technique utilizing screening is further complicated by a requirement that the pattern mixes very fine lead pitch and width surface mount pads along with standard surface mount parts. For example, in the case of tape automated bonding, the pitches vary from about 4 to 20 mils while, the standard surface mount parts have pitches in the range from about 20 to 50 mils. Due to the precision nature of the operation, it is common to utilize separate screening steps, one for the very fine lead pitch and width surface mount parts and second for the standard surface mount parts. There is the possibility of damaging the solder deposited in a previous step when multiple screening operations are carried out. Additionally, screening fine line solder represents a problem because the solder paste tends to stick in the openings of the screen as the openings get progressively narrower.

The prior art screening systems also present problems due to the difficulty of performing rework operations. Once a defective part has been removed, there is no commonly available technique for replacing the solder on the board site. While techniques exist to remove the solder after the part has been removed, replenishing the isolated site by screening is not generally feasible.

In the copending application of Raymond E. Prime and Arthur L. Leersen, entitled "Solder Placement Nozzle Assembly", filed concurrently herewith and assigned to the assignee of the present invention, a device is shown which is usable either manually or under robotic control to deposit solder onto fine line pitch and width surfaces in precise fashion. That device is capable of depositing solder on pads of surface mount board without the requirement for artwork or solder screens.

In order to provide a nozzle assembly which could be intricately machined, which was lightweight and durable, and which was of a non-wettable, non-conductive design, a polyimide material was utilized. Although providing the foregoing advantages, this material was subject to degradation due to the soldering operating temperatures (650°-800° F.) and presence of oxygen in the air surrounding the assembly. The result was unacceptable degradation of the heated tip of the soldering iron, the housing material of the nozzle assembly itself, and of the flux in the cored solder being applied by the nozzle assembly.

Another problem encountered during the operation of the nozzle assembly concerned the environment around the surface of the solder ball being applied by the solder placement nozzle. In order to prevent the formation of oxide skins on the surface of the molten solder it was initially necessary to apply generous amounts of flux to the solder site. Large amounts of flux dispensed on the solder sites produced cleanability problems, however, and sometimes contributed to solder "bridging" defects.

The present invention, accordingly, has as its object to provide a flow of a relatively cool, inert bleed gas past the heated metal tip of the soldering iron to reduce the rate and amount of degradation of the coating material on the soldering iron, as well as the rate of degradation of the fabricated nozzle housing material and the flux from the cored solder.

Another object of the invention is to exclude oxygen in the surrounding air from the interior of the nozzle assembly, by the provision of a suitable bleed gas, to thereby prevent a reaction with the material of the housing, the heated metal tip and the flux.

Another object of the invention is to provide a flow of inert cover gas to the solder application site, during soldering operations, to inhibit the formation of oxide skins on the surface of the molten solder being applied to the target substrate.

Another object of the invention is to lower the incidence of solder bridging due to polymerizing and charring of the flux being applied.

Another object of the invention is to reduce the amount of flux required for successful solder operations.

SUMMARY OF THE INVENTION

The nozzle assembly of the invention is used to deposit solder onto a target substrate as fine line pitch and width surfaces and is particularly adapted for use in depositing solder onto a series of conductive surfaces such as the solder wettable contact pads of a surface mount circuit board. The assembly includes a nozzle head having a solder feed orifice and having an interior bore sized to receive an elongate heat source for contacting solid solder fed within the interior bore through the solder feed orifice. The interior bore of the nozzle head also includes a solder reservoir for molten solder, the reservoir terminating in a tip opening for depositing molten solder onto a target substrate.

Bleed gas means are provided for supplying a bleed gas to the interior bore of the nozzle head and past the elongate heat source to the tip opening to cool the nozzle assembly and exclude oxygen in the surrounding air from entering the tip opening of the nozzle assembly. The bleed gas means can include a bleed gas port provided in the nozzle assembly which communicates with the interior bore of the nozzle head, the bleed gas port being connected with a bleed gas source. The bleed gas source is preferably a source of inert gas such as nitrogen.

The nozzle head is also preferably provided with at least one extension tube mounted thereon adjacent the nozzle tip. The extension tube is arranged to communicate with an internal passageway provided within the nozzle head. The internal passageway can be connected to an inert gas source for supplying inert cover gas to the site to be soldered.

Additional objects, features and advantages will be apparent in the written description which follows.

BRIEF DESCRIPTION OF THE DRAWINGS

FIG. 4 is a side, cross-sectional view of the nozzle head of the assembly of the invention; and FIG. 5 is an isolated view of the extension tube used with the nozzle head of FIG. 4.

DETAILED DESCRIPTION OF THE INVENTION

Figure 1:
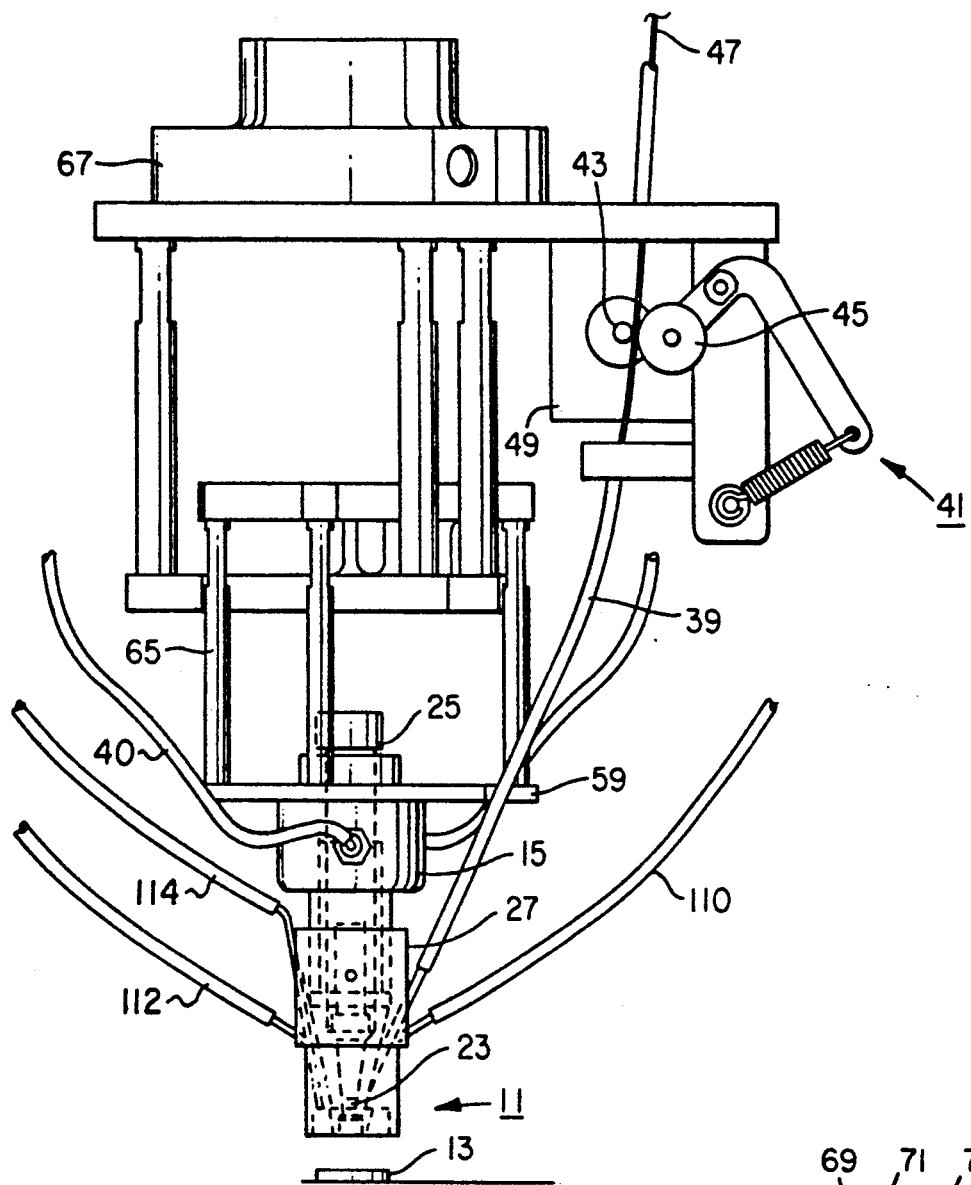
FIG. 1 is a schematic, side view of the nozzle assembly of the invention positioned over a conductive surface to be soldered.
Figure 2:
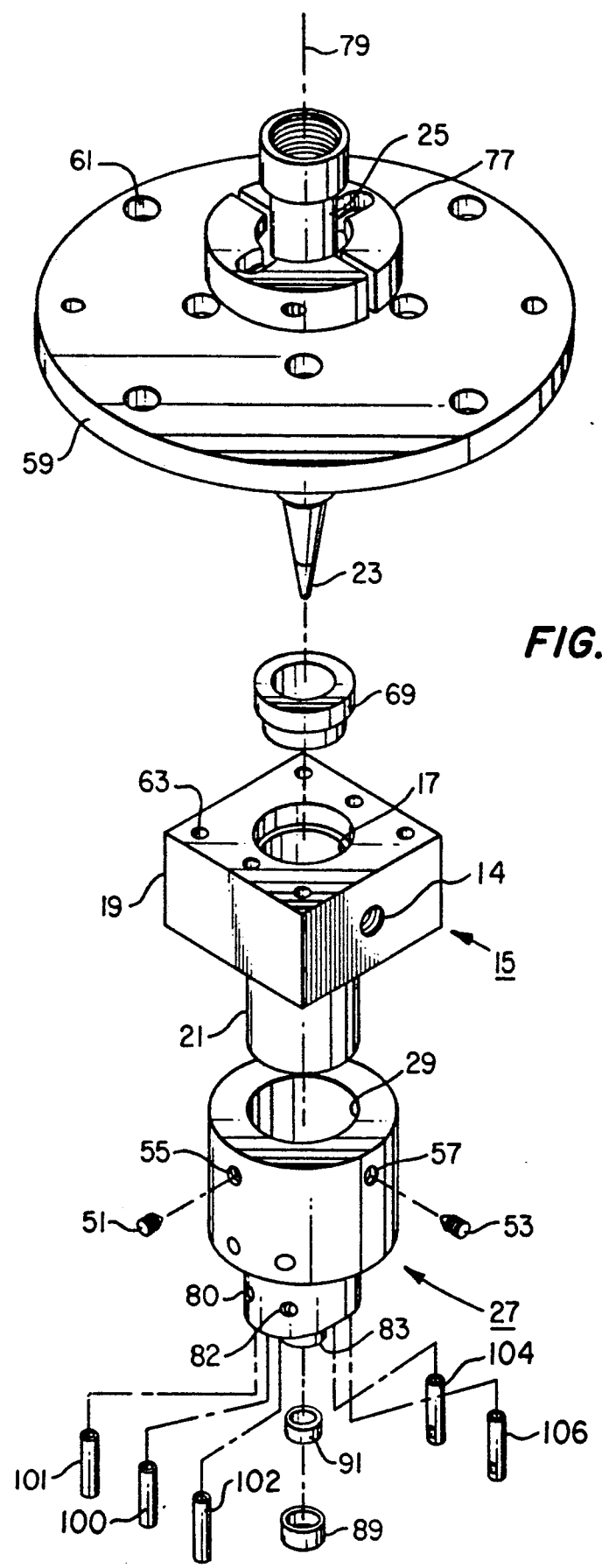
FIG. 2 is an overall perspective view of the nozzle assembly showing the components thereof in exploded fashion.

FIG. 1 shows a nozzle assembly of the invention designated generally as 11. The assembly 11 is used to deposit solder onto a selected site which is preferably a conductive surface 13. Preferably, the conductive surface 13 is the solder wettable contact pad of a surface mount integrated circuit board. The nozzle assembly 11 includes a nozzle mount (15 in FIGS. 1 and 3) which is supportable above the conductive surface 13 to be soldered. The nozzle mount 15 has a length ("1" in FIG. 3) and has an internal bore 17 sized to receive an elongate heat source. Preferably, the nozzle mount 15 has a polygonally shaped upper exterior 19, approximately square, and a generally cylindrically shaped lower exterior 21 which together define the overall length ("1"). As shown in FIG. 2, the elongate heat source is preferably the heated metal tip 23 of a conventional soldering iron 25. The soldering iron 25 is commercially available and can be, for instance, a nickel, iron or palladium coated copper soldering iron connected to a conventional electrical heating source (not shown).

The nozzle mount 15 is also provided with at least one port 14 which communicates the internal bore 17 with a source of bleed gas (e.g., through supply line 40) whereby the bleed gas is fed past the elongate heat source to cool the nozzle assembly and exclude oxygen in the surrounding air from entering the interior of the assembly. The bleed gas is preferably a cool, inert gas such as nitrogen or a noble gas such as helium, argon, etc., or a reducing gas such as forming gas. Most preferably, the bleed gas is nitrogen fed to the port 14 at a feed rate on the order of 5 SCFH during the time periods when actual soldering is not occurring.

The nozzle assembly 11 also includes a nozzle head 27 which has an upper, generally cylindrical interior bore (29 in FIG. 4) which joins a lower, converging interior bore 31 provided with a solder feed orifice 33 connected by a slanting internal passageway 35 which passes through the body 37 of the nozzle head 27 to a source of solid solder being fed to the passageway. As shown in FIG. 1, the internal passageway 35 can be connected by a tube 39 to a solder wire feed assembly 41. The feed assembly 41 can include, e.g., a motor driven gear wheel 43 and a pressure wheel 45 which are used to deliver a known length of wire solder 47 to the orifice 33. Advancement of the wire solder 47 can be precisely controlled through the use of a stepper motor 49, as will be appreciated by those skilled in the art. Solder fed through the orifice 33 melts on the heated metal tip 23 of the soldering iron and flows to the bottom of a reservoir (81 in FIG. 4) formed by the converging interior bore 31 of the nozzle head 27 to form a small solder volume.

Figure 3:
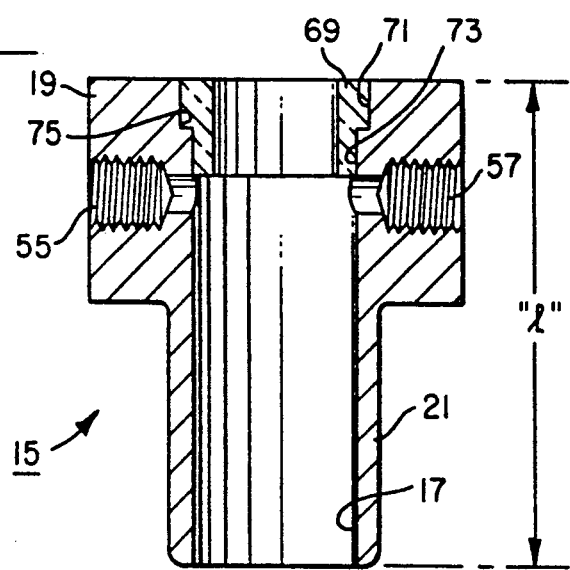
FIG. 3 is a side, cross-sectional view of the nozzle mount of the assembly.

Mounting means are provided for removably mounting the nozzle head 27 to the nozzle mount 15. As shown in FIGS. 2 and 3, the mounting means can conveniently comprise a threaded member, such as set screws 51, 53 which are received within mating threaded bores 55, 57 provided in the nozzle head 27. The set screws are engageable with the nozzle mount lower exterior 21 to removably secure the nozzle head 27 to the nozzle mount The nozzle mount 15 can be supported in any convenient fashion over the conductive surface 13 to be soldered In the embodiment of FIG. 1, the nozzle mount 15 is secured to a circular attachment plate 59 by means of mating bores 61, 63 (FIG. 2) which are adapted to receive engagement means such as screw connectors. The attachment plate 59 is, in turn, supported by means of a yoke assembly 65 (FIG. 1) from a robot assembly 67. It will be understood, however, that the nozzle assembly 11 could be supported in a variety of fashions, depending upon the particular soldering application.

Preferably, the nozzle mount 15 and nozzle head 27 are formed from a non-wettable, plastic material. A preferred material is the polyimide sold under the trade name VESPEL by E.I. duPont deNemours & Company. This material is lightweight, easily machinable and, to some extent chemically resistant. However, the material is degraded rapidly at high temperatures for long periods of time. At operating temperatures above 500°-600° F., dimensions, thermal conductivity and other critical properties of the VESPEL material change.

In order to maintain proper operating temperatures for the soldering iron 25 and to protect the surrounding nozzle mount 15, an insulating sleeve (69 in FIG. 3) is preferably received within the internal bore 17 of the nozzle mount 15 to separate the heated metal tip 23 of the soldering iron 25 from the plastic components of the nozzle assembly. As shown in FIG. 3, the internal bore 17 of the nozzle mount 15 is defined by generally cylindrical sidewalls, the internal diameter of the sidewalls decreasing from an upper extent 71 to a lower extent 73 to form an internal shoulder 75. The insulating sleeve 69 has a stepped external diameter sized to be received upon the internal shoulder 75 in the nozzle mount interior bore 17. The insulating sleeve 69 is preferably formed from a high temperature machinable ceramic material having low thermal conductivity and high temperature resistance. A suitable material is commercially available under the trade name MACOR.

As shown in FIGS. 1 and 2, the attachment plate 59 supports the nozzle mount 19 and includes a mounting collar 77 for mounting and orienting the soldering iron 25 along a vertical axis 79 coincident with the internal bore 17 of the nozzle mount and the interior bore 29 of the nozzle head 27. One or more soldering iron centering screws are received in threaded bores 80, 82 for properly aligning the heated metal tip 23. The assembled nozzle head and nozzle mount support the heated metal tip 23 of the soldering iron 25 with the heated metal tip 23 contacting the insulating sleeve 69 rather than the plastic material of the nozzle mount.

As shown in FIG. 4, the converging interior bore 31 of the nozzle head 27 terminates in a solder reservoir (generally illustrated at 81) for molten solder which is fed within the lower, converging interior bore 31 from the orifice 33 to contact the heated metal tip 23 of the soldering iron. The converging interior bore 31 terminates in a tip opening 83 for depositing solder from the solder reservoir 81 onto the soldering site.

A replaceable insert assembly 85 is received within the tip opening 83 of the nozzle head 27. The insert assembly 85 includes a generally cylindrical, wettable wall region 87 for contacting the molten solder passing from the solder reservoir 81 out the tip opening 83. Preferably, the insert assembly 85 includes an outer ring 89 of non-wettable material and an inner ring 91 of wettable material which is sized to be press-fit within the outer ring 89. The nozzle tip opening 83 is generally cylindrically shaped and is sized to receive the insert assembly in press-fit fashion. As best seen in FIG. 4, the tip opening 83 decreases in internal diameter to form a stop or shoulder region 93 to facilitate positioning of the replaceable insert assembly 85. The wettable ring 91 can be formed from, e.g., nickel, while the outer ring 89 can be of a plastic similar or identical to the plastic of the nozzle head 27.

As also shown in FIG. 4, the body 37 of the nozzle head 27 can also be provided with one or more internal passageways 95. These passageways are located within the wall section of the body 37 between the interior bore 31 and the exterior of the nozzle head 27. Passageway 95 includes an inlet opening 97 provided in the upper section 19 of the nozzle head 27 which communicates by means of angled passageway 95 with an outlet opening 99 in the lower portion 21 of the nozzle head. Preferably, a generally cylindrical extension tube 101 is received within a counter bored opening 103 which connects the tip region 105 of the nozzle head 27 with the outlet opening 99 of the internal passageway 95. The extension tube 101 includes a circular, side opening 107 in the region of the nozzle tip 109. It will be understood that, in some applications, the extension tube 101 will be a straight piece of tubing having an open end in the region of the nozzle tip 109, rather than having the circular, side opening 107. In the embodiment of the tool shown in FIG. 2, twin nozzles 104, 106 located at the front of the nozzle assembly are used to supply an inert cover gas from supply lines 112, 114 during soldering operations.

One or more of the internal passageways 95 can also be connected to a source of soldering flux by means of a supply tube (110 in FIG. 1), whereby flux supplied through the extension tube opening 107 can be applied to a solder site adjacent the tip opening 83. Preferably, a plurality of passageways and extension tubes 100, 102 (FIG. 2) are spaced about the circumference of the tip opening 83 in order to merge the application of inert cover gas and flux at the solder application site.

In operation, the nozzle assembly 11 is used to deposit solder onto solder wettable contact pads 13, with solder being deposited in substantially uniform amounts on each pad. The reservoir 81 of the nozzle head comprises a plenum for the solder fed through the orifice 33 and melted by the heated tip 23 of the soldering iron 25. After a sufficient amount of solder is fed, a small ball of molten solder becomes extended below the nozzle tip. The nozzle tip 109 is supported over the soldering site and maintained at a sufficient, predetermined distance above the substrate so that contact between the pad and nozzle tip does not occur. The wettable ring 91 and soldering tip 23 provide a predetermined surface tension which causes a discrete amount of solder to be deposited upon the soldering site as the assembly 11 is moved over the substrate. During actual soldering operations, selected ones of the extension tubes 101 and internal passageways supply an inert cover gas to the solder application site. During those time periods when solder is not being applied, an inert bleed gas is flowed through the interior of the nozzle assembly to protect the components thereof and exclude oxygen from the nozzle interior.

An invention has been provided with several advantages. The nozzle assembly of the invention merges flux and solder in the vicinity of the nozzle tip to prevent contamination of the molten solder and reduce the amount of flux needed. One or more internal passageways and extension tubes permit flux and/or an inert cover gas to be provided at a focal point adjacent the nozzle tip where solder is being applied. The extension tubes can be used to apply flux to the soldering site before and after the soldering process. By flowing an inert bleed gas through the interior of the assembly, the useful life of the assembly is prolonged. Incidences of solder bridging are also reduced.

While the invention has been shown in only one of its forms, it is not thus limited but is susceptible to various changes and modifications without departing from the spirit thereof.

I claim:

1. A nozzle assembly of the type which includes a heated metal tip of a soldering iron for depositing solder onto a series of conductive surfaces, the nozzle assembly comprising:

a nozzle mount supportable above the conductive surface to be soldered, the nozzle amount having a length and having an internal bore sized to receive the heated metal tip of a soldering iron;

a nozzle head formed of a non-conductive plastic material removably mounted on the nozzle mount, the nozzle head having a solder feed orifice and having an interior bore sized to receive a portion of the length of the nozzle mount, thereby allowing the heated metal tip of the soldering iron to extend at least partly within the interior bore of the nozzle head for contacting solid solder fed within the interior bore through the solder feed orifice, the interior bore of the nozzle head including a solder reservoir for molten solder, the reservoir terminating in a tip opening for depositing molten solder onto a conductive surface; and bleed gas means for supplying a bleed gas to the internal bore of the nozzle mount, past the heated metal tip of the soldering iron, and to the interior bore of the nozzle head to cool the nozzle assembly and exclude oxygen in the surrounding air form entering the nozzle assembly.

2. The nozzle assembly of claim 1, wherein the bleed gas means includes a bleed gas port provided in the nozzle mount which communicates with the interior bore of the nozzle mount, the bleed gas port being connected with a bleed gas source.

3. The nozzle assembly of claim 2, wherein the bleed gas source is a source of nitrogen gas.

4. A nozzle assembly of the type which includes a heated metal tip of a soldering iron for depositing solder onto a series of conductive surfaces, the nozzle assembly comprising:
- a nozzle mount supportable above the conductive surface to be soldered, the nozzle mount having a length and having an internal bore sized to receive the heated metal tip of a soldering iron;
- a nozzle head formed of a non-conductive plastic material removably mounted on the nozzle mount, the nozzle head having a solder feed orifice and having an interior bore sized to receive a portion of the length of the nozzle mount, thereby allowing the heated metal tip of the soldering iron to extend at least partly within the interior bore of the nozzle head for contacting solid solder fed within the interior bore through the solder feed orifice, the interior bore of the nozzle head including a solder reservoir for molten solder, the reservoir terminating in a tip opening for depositing molten solder onto a conductive surface; and
- bleed gas means for supplying a bleed gas to the internal bore of the nozzle mount, past the heated metal tip of the soldering iron and to the interior bore of the nozzle head to cool the nozzle assembly and exclude oxygen in the surrounding air from entering the nozzle assembly;
- cover gas means for supplying a cover gas to the exterior of the nozzle tip as molten solder is being deposited through the tip opening to inhibit oxidation of the solder, the cover gas means comprising at least one internal passageway provided in the body of the nozzle head isolated from the interior bore thereof.

5. The nozzle assembly of claim 4, wherein the at least one internal passageway provided in the body of the nozzle head is connected to an extension tube which extends downwardly from the nozzle head in the direction of the tip opening of the nozzle head.

6. The nozzle assembly of claim 5, wherein the cover gas is an inert gas.

7. The nozzle assembly of claim 6, wherein the cover gas is nitrogen gas.

* * * * *

UNITED STATES PATENT AND TRADEMARK OFFICE
CERTIFICATE OF CORRECTION

PATENT NO. : 5,065,932

DATED : Nov. 19, 1991

INVENTOR(S) : Terry F. Hayden et al.

It is certified that error appears in the above-identified patent and that said Letters Patent is hereby corrected as shown below:

Title page;

Please change inventor's name from "Alvin D. Nguyne" to --Alvin D. Nguyen--.

Signed and Sealed this

Twelfth Day of January, 1993

Attest:

DOUGLAS B. COMER

Attesting Officer

Acting Commissioner of Patents and Trademarks